(12) United States Patent
Kikuchi

(10) Patent No.: US 8,490,108 B2
(45) Date of Patent: Jul. 16, 2013

(54) METHOD OF ESTIMATING A PROCESSING TIME OF EACH OF A PLURALITY OF JOBS AND APPARATUS THEREOF

(75) Inventor: Shinji Kikuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 288 days.

(21) Appl. No.: 12/959,648

(22) Filed: Dec. 3, 2010

(65) Prior Publication Data

US 2011/0138397 A1 Jun. 9, 2011

(30) Foreign Application Priority Data

Dec. 7, 2009 (JP) ................................ 2009-277239

(51) Int. Cl.
*G06F 9/46* (2006.01)
(52) U.S. Cl.
USPC ............................ 718/106; 718/100; 718/101
(58) Field of Classification Search
USPC ......................................... 718/100, 101, 106
See application file for complete search history.

(56) References Cited

U.S. PATENT DOCUMENTS

| 5,465,354 | A | 11/1995 | Hirosawa et al. | |
|---|---|---|---|---|
| 6,112,221 | A * | 8/2000 | Bender et al. | 718/102 |
| 6,986,139 | B1 * | 1/2006 | Kubo | 718/105 |
| 7,058,946 | B2 * | 6/2006 | Acharya et al. | 718/102 |
| 2004/0123297 | A1 * | 6/2004 | Flautner et al. | 718/102 |
| 2006/0242356 | A1 * | 10/2006 | Mogi et al. | 711/100 |
| 2007/0288443 | A1 | 12/2007 | Sakurai et al. | |
| 2008/0010642 | A1 * | 1/2008 | MacLellan et al. | 718/102 |

FOREIGN PATENT DOCUMENTS

| JP | 5-265775 A | 10/1993 |
|---|---|---|
| JP | 2000-227811 A | 8/2000 |
| JP | 2003-44327 A | 2/2003 |
| JP | 2004-5205 A | 1/2004 |
| JP | 2005-71171 A | 3/2005 |
| JP | 2007-328712 A | 12/2007 |

* cited by examiner

*Primary Examiner* — Van Nguyen
(74) *Attorney, Agent, or Firm* — Fujitsu Patent Center

(57) ABSTRACT

A processing time estimation method for estimating a processing time of each of a plurality of jobs, the processing time estimation method including determining, executed by a computer, whether the each job has a preceding job thereof on the basis of previous execution data including previous information of a plurality of previous start times and previous finish times of respective jobs of the plurality of jobs, the preceding job of the each job being included in the plurality of jobs and at least having the previous finish time earlier than the previous finish time of the each job.

9 Claims, 12 Drawing Sheets

FIG. 2

| JOB NAME | START TIME | FINISH TIME |
|---|---|---|
| J1.sh | 2009/06/01 00:00:00 | 2009/06/01 00:25:00 |
| J2.sh | 2009/06/01 00:25:01 | 2009/06/01 01:25:00 |
| J3.sh | 2009/06/01 01:25:01 | 2009/06/01 02:15:00 |
| J4.sh | 2009/06/01 01:00:00 | 2009/06/01 02:10:00 |
| J1.sh | 2009/06/02 00:00:00 | 2009/06/02 00:35:00 |
| J2.sh | 2009/06/02 00:35:01 | 2009/06/02 01:45:00 |
| J3.sh | 2009/06/02 01:45:01 | 2009/06/02 02:53:00 |
| J4.sh | 2009/06/02 01:00:00 | 2009/06/02 02:25:00 |
| J1.sh | 2009/06/03 00:00:00 | 2009/06/03 00:30:00 |
| J2.sh | 2009/06/03 00:30:10 | 2009/06/03 01:20:00 |
| J3.sh | 2009/06/03 01:20:01 | 2009/06/03 02:20:00 |
| J4.sh | 2009/06/03 01:00:00 | 2009/06/03 02:10:00 |
| J1.sh | 2009/06/04 00:00:00 | 2009/06/04 00:25:00 |
| J2.sh | 2009/06/04 00:25:01 | 2009/06/04 01:35:00 |
| J3.sh | 2009/06/04 00:35:01 | 2009/06/04 02:30:00 |
| J4.sh | 2009/06/04 01:00:00 | 2009/06/04 02:30:00 |
| J1.sh | 2009/06/05 00:00:00 | 2009/06/05 00:35:00 |
| J2.sh | 2009/06/05 00:35:01 | 2009/06/05 01:35:00 |
| J3.sh | 2009/06/05 00:35:01 | 2009/06/05 01:52:00 |
| J4.sh | 2009/06/05 01:00:00 | 2009/06/05 02:40:00 |
| ⋮ | ⋮ | ⋮ |

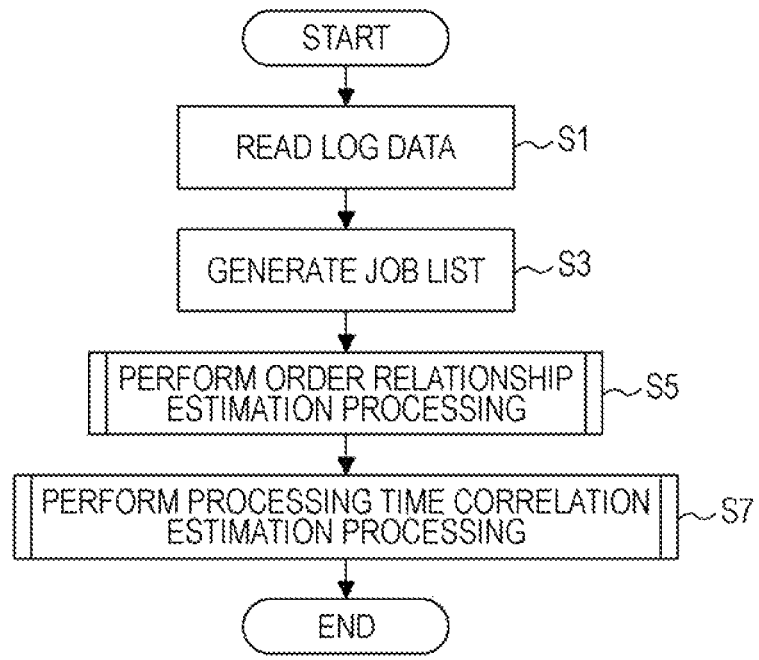

| LINK | PROCEEDING JOB (NODE) | SUBSEQUENT JOB (NODE) | TYPE |
|---|---|---|---|
| L1 | N1 | N2 | NEXT |
| L2 | N2 | N3 | NEXT |
| L3 | N2 | N4 | ACTIVATE |

| JOB NAME | JOB PROCESSING TIME DATA | |
|---|---|---|
| | AVERAGE VALUE | CORRELATED VARIABLE |
| JOB J1.sh | 30 | X |
| JOB J3.sh | 60 | 2X |

| NODE | JOB NAME | JOB PROCESSING TIME DATA | |
|---|---|---|---|
| | | AVERAGE VALUE | CORRELATED VARIABLE |
| N1 | J1.sh | 30 | X |
| N2 | J2.sh | 60 | Y |
| N3 | J3.sh | 60 | 2X |
| N4 | J4.sh | 70 | Z |

FIG. 17

| TIME | EXECUTION TIME (ACTUAL VALUE INCLUDING WAITING TIME) | | | | WAITING TIME | SUBSTANTIAL PROCESSING TIME MAX ESTIMATED VALUE (EXECUTION TIME - WAITING TIME, AVERAGE VALUE) | | | | | |
|---|---|---|---|---|---|---|---|---|---|---|---|
| | J1.sh | J2.sh | J3.sh | J4.sh | J4.sh | J1.sh | J2.sh | J3.sh | J4.sh | TOTAL | FINISH TIME |
| 0:00 | 0 | 0 | 0 | 0 | 0 | 30 | 60 | 60 | 70 | 160 | 2:40 |
| 0:10 | 10 | 0 | 0 | 0 | 0 | 30 | 60 | 60 | 70 | 160 | 2:40 |
| 0:20 | 20 | 0 | 0 | 0 | 0 | 30 | 60 | 60 | 70 | 160 | 2:40 |
| 0:30 | 30 | 0 | 0 | 0 | 0 | 30 | 60 | 60 | 70 | 160 | 2:40 |
| 0:40 | 40 | 0 | 0 | 0 | 0 | 40 | 60 | 80 | 70 | 180 | 3:00 |
| 0:50 | 40 | 10 | 0 | 0 | 0 | 40 | 60 | 80 | 70 | 180 | 3:00 |
| 1:00 | 40 | 20 | 0 | 0 | 10 | 40 | 60 | 80 | 70 | 180 | 3:00 |
| 1:10 | 40 | 30 | 0 | 10 | 20 | 40 | 60 | 80 | 70 | 180 | 3:00 |
| 1:20 | 40 | 40 | 0 | 20 | 30 | 40 | 60 | 80 | 70 | 180 | 3:00 |
| 1:30 | 40 | 50 | 0 | 30 | 40 | 40 | 60 | 80 | 70 | 180 | 3:00 |
| 1:40 | 40 | 60 | 0 | 40 | 50 | 40 | 60 | 80 | 70 | 180 | 3:00 |
| 1:50 | 40 | 70 | 0 | 50 | 50 | 40 | 70 | 80 | 70 | 190 | 3:10 |
| 2:00 | 40 | 70 | 10 | 60 | 50 | 40 | 70 | 80 | 70 | 190 | 3:10 |

METHOD OF ESTIMATING A PROCESSING TIME OF EACH OF A PLURALITY OF JOBS AND APPARATUS THEREOF

CROSS-REFERENCE TO RELATED APPLICATION

This application is based upon and claims the benefit of priority of the prior Japanese Patent Application No. 2009-277239 filed on Dec. 7, 2009, the entire contents of which are incorporated herein by reference.

FIELD

The embodiments discussed herein are related to a processing time estimation method and a processing time estimation apparatus.

BACKGROUND

In a large computer operating system, many batch jobs are executed. A batch job is a set of jobs to be executed every predetermined period of time, such as sales calculation processing for one day. Typically, a certain amount of a data set is processed by a program or a script. Order relationships in various forms exist between batch job, and the batch jobs may often interlock with each other. An example of the order relationship is that the end of order confirmation processing is to be followed by the start of the sales calculation processing. Another example may be that when a batch job A outputs a file C, a batch job B waiting for it starts processing on the file C.

However, the order relationship between batch jobs may not easily be recognized. For example, when a batch job B is started in accordance with a message output from a program for a batch job A, analyzing the program may be desirable to identify the order relationship. This may not be realized in fact. In recent years, companies have been frequently merged, and a plurality of systems is merged with them. If the developers and operators are located in different places, requested batch-order-relationship definition information may not be easily accessed.

The "Punctuality" is desirable for executing a batch job. In other words, a batch job may often be executed during night to prevent influences on normal service processing. However, for example, for the service start at nine in the morning, a batch job may be finished before five in the morning. Therefore, if the completion of a batch job before a predetermined time may be desirable, the notification of the fact may be desirable as early as possible. This is for addressing the problem by, for example, postponing a batch job which may be executed on the next day. In other words, once a predetermined deadline is violated, the time for executing the batch job is desirable to adjust since it is too late.

Accordingly, there has been provided a technology of estimating a delay of a desirable job in the future through automatic monitoring of jobs, for real-time higher punctuality and efficiency of monitoring and operations in an entire system. More specifically, start/finish time information of one job are extracted from its history information, and predetermined warning information is transmitted on the basis of the difference between the start/finish time and the current time of the job in a monitoring schedule. However, since the technology does not implement processing of correctly extracting the order relationship between jobs, the job finish time may not be estimated with high accuracy in accordance with the execution condition. It may be desirable for the technology to handle parallel processing under a dependent relationship in which when a batch job A outputs a file C, a waiting batch job B starts processing on the file C.

There has been provided another technology of extracting general processing order pattern of services from history information on service processing executed by a human being. However, the order of service processing by a human being acquired may not be used for analysis of a processing order pattern of batch jobs. It is desirable for the technology to handle a case unique to batch jobs as described above, that is, the case that when a batch job A outputs a file C, a waiting batch job B starts processing on the file C.

There has been provided another technology for improving the accuracy of the estimation of the execution end times of jobs even when loads on computers vary in an information processing system being capable of executing a plurality of jobs. More specifically, first of all, during parallel execution of a plurality of jobs, information on the throughputs of the jobs is collected. Next, on the basis of the collected information (including a list of priority jobs to be finished first), the estimated execution finish time of each of the jobs is calculated. From the estimated execution finish times calculated for the jobs, the desired execution finish times of the jobs are calculated. However, this technology calculates the progress rate of a single job from the state of use of a resource and estimates the finish time of the single job from it. Since this technology may only grasp a simple relationship between jobs, accurate estimation of the finish times is desirable.

SUMMARY

According to an aspect of an embodiment, a processing time estimation method for estimating a processing time of each of a plurality of jobs, the processing time estimation method including determining, executed by a computer, whether the each job has a preceding job thereof on the basis of previous execution data including previous information of a plurality of previous start times and previous finish times of respective jobs of the plurality of jobs, the preceding job of the each job being included in the plurality of jobs and at least having the previous finish time earlier than the previous finish time of the each job, calculating, executed by the computer, a previous processing time of the each job, the previous processing time of the each job being calculated on the basis of the previous start time and the previous finish time of the each job whether the each job does not have the preceding job thereof, the previous processing time of the each job being calculated on the basis of the previous start time and the previous finish time of the each job and the previous finish time of the preceding job of the each job whether the each job has the preceding job thereof, calculating, executed by the computer, a processing time of the each job on the basis of the previous processing times of the each job, and calculating, executed by the computer, an estimated processing time of the each job on the basis of current execution data including current information of a current start time and a current finish time of the respective jobs of the plurality of jobs, the estimated processing time of the each job being calculated on the basis of the estimated processing time of the depended job of the each job if the each job does not finish and has the depended job thereof.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an example of data stored in a log data storage unit;
FIG. 3 illustrates a processing flow of a pre-processing;
FIG. 4 illustrates an example of a job list;
FIG. 17 illustrates an example of data stored in a monitoring data storage unit.

DESCRIPTION OF EMBODIMENTS

Figure 1:
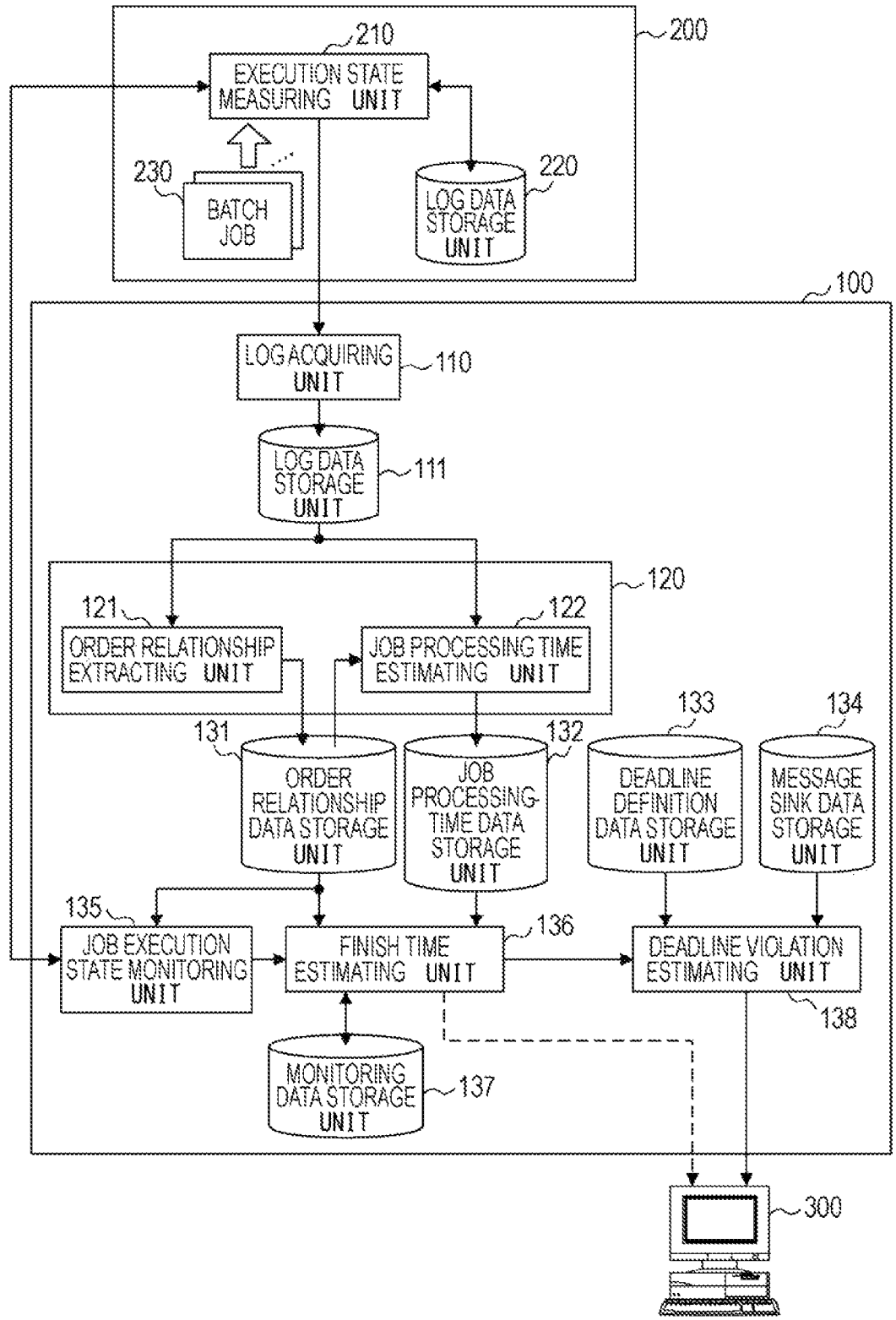
FIG. 1 is a system routine diagram.

A schematic diagram of a system according to an embodiment is illustrated in FIG. 1. A monitoring target system 200 which executes a batch job has an execution state measuring unit 210 which measures the execution condition of a batch job 230, and a log data storage unit 220 which stores log data output as data describing the execution condition of the batch job 230 from the execution state measuring unit 210.

The monitoring target system 200 is connected to a batch job processing-time estimation apparatus 100 over a network. The batch job processing-time estimation apparatus 100 has a log acquiring unit 110 which acquires log data from the execution state measuring unit 210 in the monitoring target system 200. The monitoring target system 200 has a log data storage unit 111 which stores log data acquired by the log acquiring unit 110. The monitoring target system 200 has a job net model generating unit 120 which performs processing by using data stored in the log data storage unit 111. The monitoring target system 200 has an order relationship data storage unit 131 which stores a processing result from the job net model generating unit 120. The monitoring target system 200 has a job processing-time data storage unit 132 which stores a processing result from job net model generating unit 120. The monitoring target system 200 has a job execution state monitoring unit 135 which acquires execution condition data of a batch job 230 currently being executed from the execution state measuring unit 210 in the monitoring target system 200 by using data stored in the order relationship data storage unit 131. The monitoring target system 200 has a finish time estimating unit 136 which performs processing by using data stored in the order relationship data storage unit 131 and job processing-time data storage unit 132 and an output from the job execution state monitoring unit 135. The monitoring target system 200 has a monitoring data storage unit 137 which stores data to be used by the finish time estimating unit 136. The monitoring target system 200 has a deadline definition data storage unit 133. The monitoring target system 200 has a message sink data storage unit 134. The monitoring target system 200 has a deadline violation estimating unit 138 which performs processing by using data stored in the deadline definition data storage unit 133 and message sink data storage unit 134 and an output from the finish time estimating unit 136.

The job net model generating unit 120 has the order relationship extracting unit 121 which performs processing by using data stored in the log data storage unit 111 and stores order relationship data that is a result of the processing in the order relationship data storage unit 131. The job net model generating unit 120 has the job processing time estimating unit 122 which performs processing by using data stored in the log data storage unit 111 and order relationship data storage unit 131 and stores job processing-time data that is a result of the processing in the job processing-time data storage unit 132.

The batch job processing-time estimation apparatus 100 is connected to an operator terminal 300 such as a personal computer and a cellular phone over a network.

Next, with reference to FIG. 2 to FIG. 17, details of pre-processing to be performed by the batch job processing-time estimation apparatus 100. It is assumed there that the log acquiring unit 110 has already acquired log data for a predetermined period in the past from the execution state measuring unit 210 and stored the log data in the log data storage unit 111. The log data storage unit 111 may store data as illustrated in FIG. 2, for example. In the example in FIG. 2, the job name, start time, and finish time are stored for each executed batch job. In the example in FIG. 2, log data for five days are only illustrated. However, data for more days may be acquired.

Next, in step S1 in FIG. 3, the order relationship extracting unit 121 in the job net model generating unit 120 reads log data stored in the log data storage unit 111. Next, in step S3, the order relationship extracting unit 121 extracts all job names, generates a job list thereof and stores it in the order relationship data storage unit 131, for example. For example, the order relationship extracting unit 121 may generate a list of job names of batch jobs having appeared even once and assigns node numbers thereto. In other words, as illustrated in FIG. 4, the node numbers and job names are stored in association in the log data storage unit 111.

In step S5, the order relationship extracting unit 121 performs order relationship estimation processing. The order relationship estimation processing may be described with reference to FIG. 5 to FIG. 9.

Figure 5:
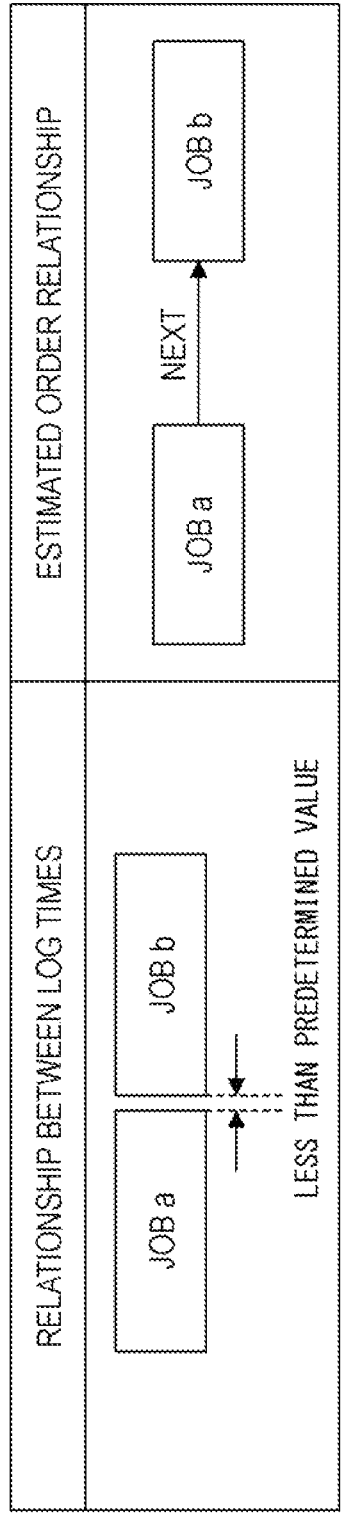
FIG. 5 illustrates a direct serial starting relationship.
Figure 6:
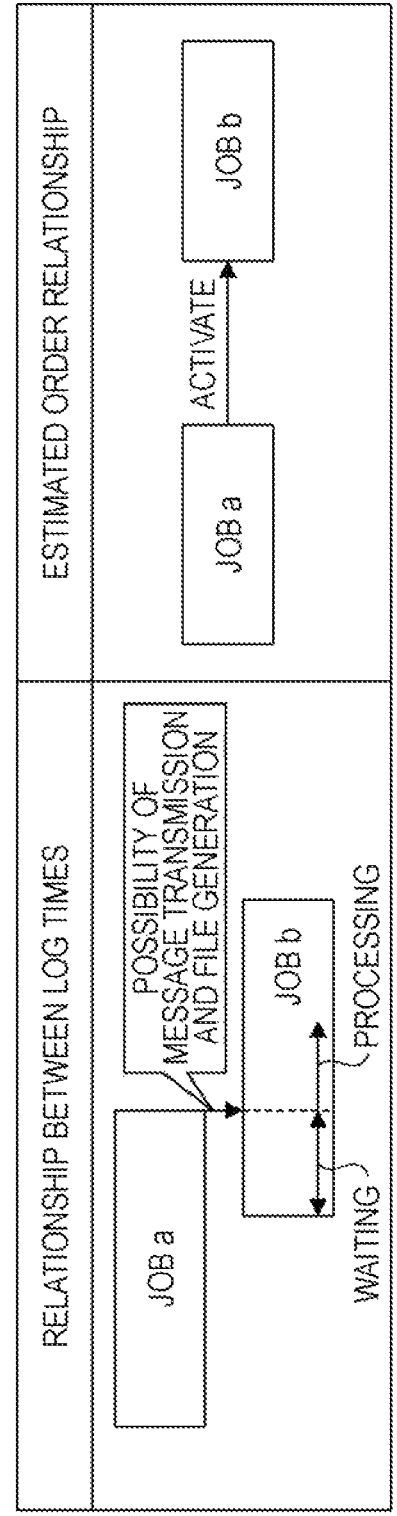
FIG. 6 illustrates a queuing relationship.

The order relationship estimation processing extracts a direct serial starting (next) relationship (also called a direct serial starting pattern) as illustrated in FIG. 5 and a queuing (activate) relationship (also called a queuing pattern) as illustrated in FIG. 6. As illustrated in FIG. 5, when a batch job B that is a subsequent batch job is often started immediately after a batch job A that is a preceding batch job finishes, it may be determined that the batch job A and the batch job B has the next relationship therebetween. More specifically, when the start time of the batch job B is recorded less than a predetermined value from the finish time of the batch job A (such as within one second), it may be estimated that the order relationship of the next relationship from the batch job A to the batch job B exists.

As illustrated in FIG. 6, batch job B may often be started to execute before the finish time of the batch job A that is a preceding batch job, and the batch job A may often be finished before the finish time of the batch job B. In that case, it is estimated that the batch job B waits for a message issued or file generation by the batch job A, and it is determined that the batch job A and the batch job B has the activate relationship. The start time of the batch job B may be desirable to be predetermined.

Figure 7:
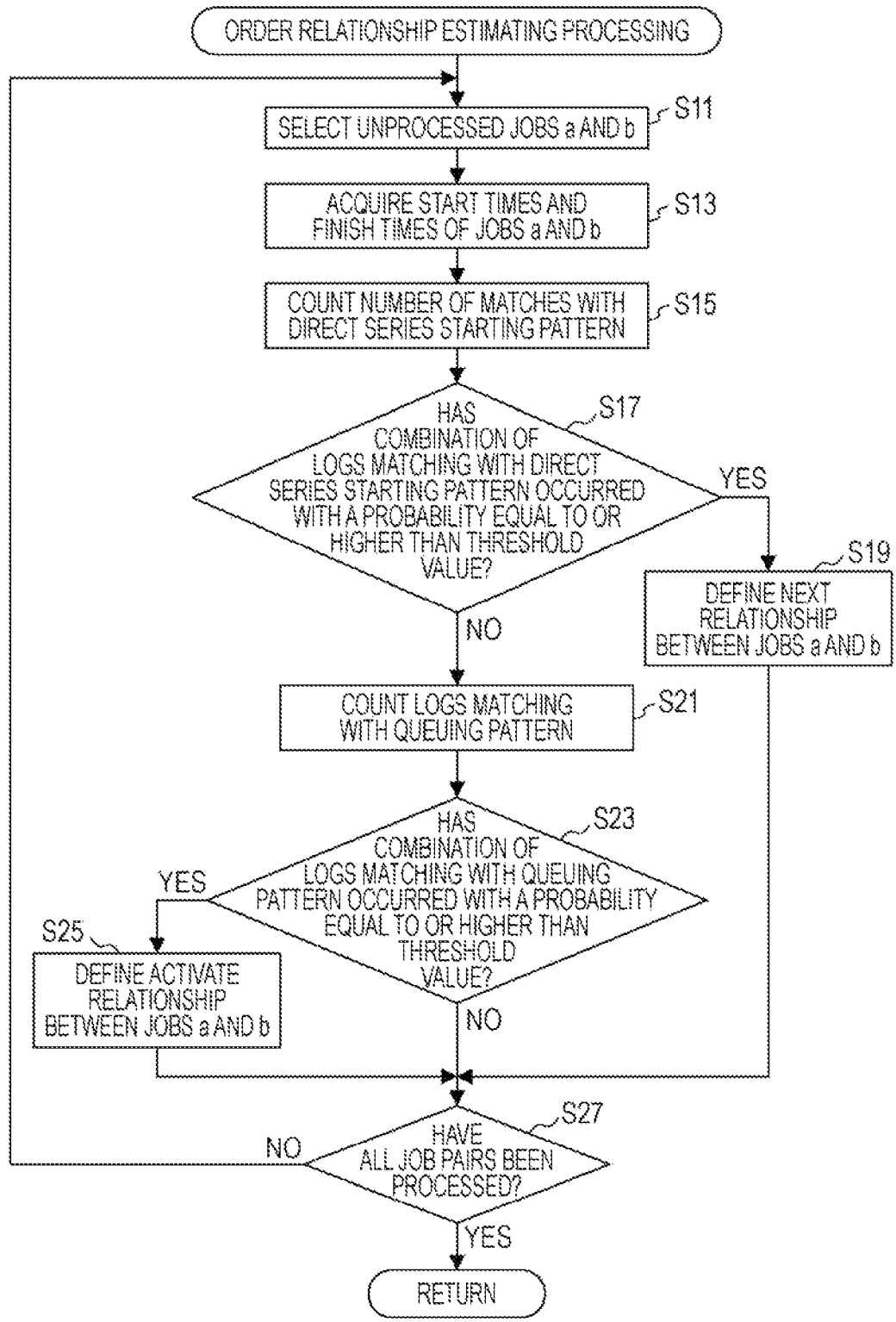
FIG. 7 illustrates a processing flow of an order relationship estimation processing.
Figures 8, 9:
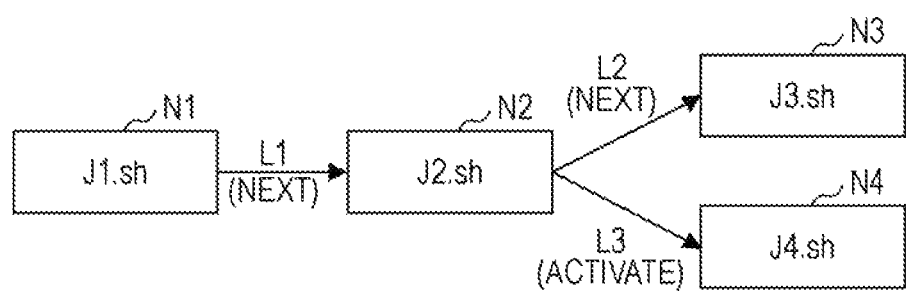
FIG. 8 illustrates an example of data stored in an order relationship data storage unit.
FIG. 9 schematically illustrates order relationship data.
Figure 10:
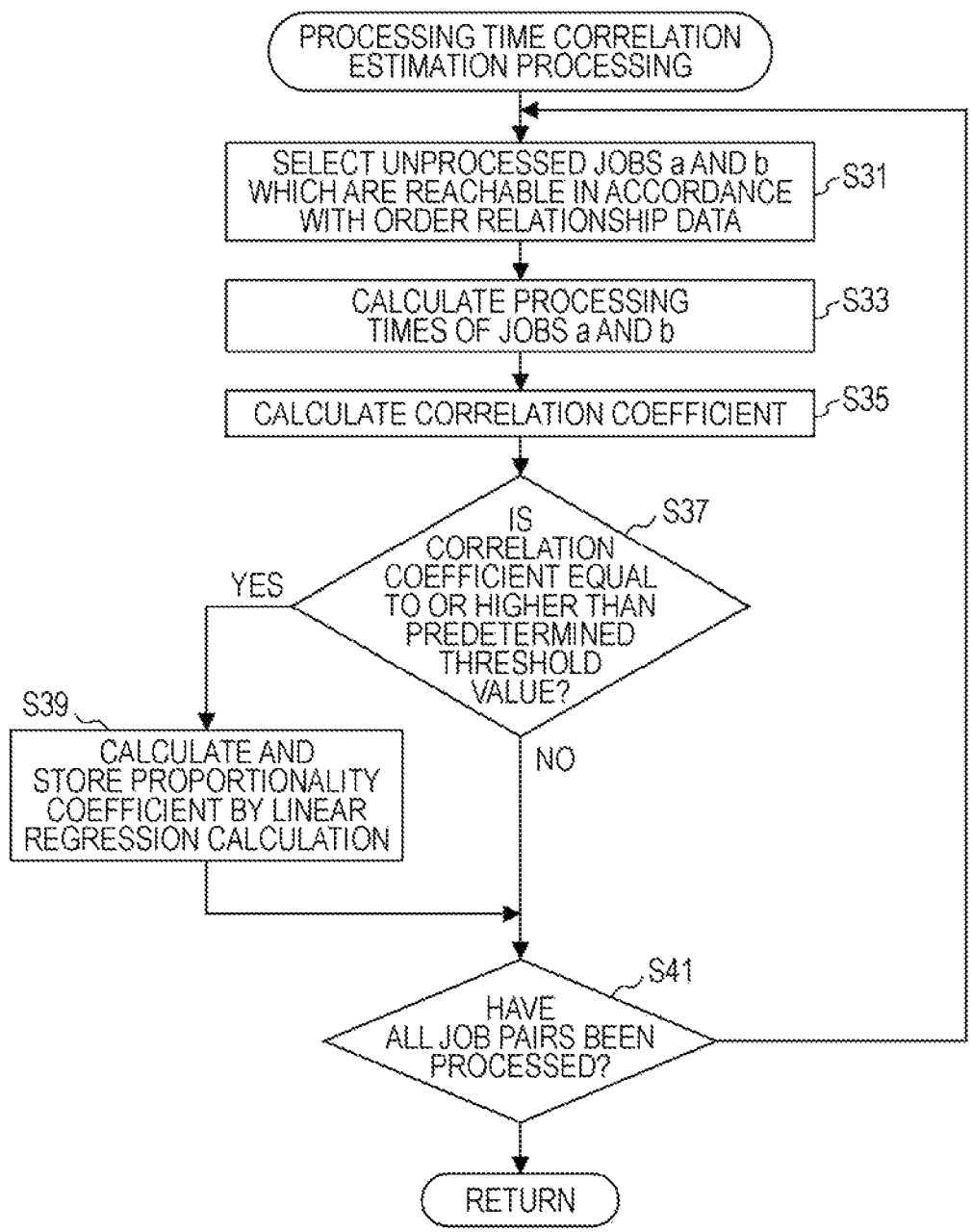
FIG. 10 illustrates a processing flow of processing-time-correlation estimation processing.

The relationship as described above is extracted from the log data by processing illustrated in FIG. 7 to FIG. 9. In step S11, the order relationship extracting unit 121 selects unprocessed batch jobs a and b from the job list. In step S13, the order relationship extracting unit 121 extracts log data of the batch jobs a and b from the read log data and extracts the start time and finish time of the batch jobs a and b. The number of logs of the batch job a or the number of logs of the batch job b may be a combination number of logs, or the number as a result of the division of the total number of logs by two may be the combination number of logs.

The order relationship extracting unit 121 determines whether the combination of the log of the batch job a and the log of the batch job b has a difference between the finish time of the batch job a and the start time of the batch job b is equal to or within one second, for example, and matches with the direct serial starting pattern or not. In the same manner, the order relationship extracting unit 121 determines whether the combination of the logs has a difference between a finish time of the batch job b and a start time of the batch job a is equal to or within one second, for example, and matches with the direct serial starting pattern or not. In step S15, the order relationship extracting unit 121 counts the number of times of matching for each of the order from the batch job b to the batch job a and the order from the batch job a to the batch job b separately. For example, in the example in FIG. 2, in the shift from the batch job J1.sh to the batch job J2.sh, the number of times of matching with the direct serial starting pattern is "four" against the combination number 5 of the logs. For the shift from the batch job J2.sh to the batch job J3.sh, the number of times of matching with the direct serial starting pattern is "five" against the combination number 5 of the logs.

After that, in step S17, the order relationship extracting unit 121 determines whether the combination of logs matching with the direct serial starting pattern occurs with a probability that is equal to or higher than a threshold value or not. For example, when 80% is the threshold value, the shift from the batch job J1.sh to the batch job J2.sh and the shift from the batch job J2.sh to the batch job J3.sh are determined to correspond to the direct serial starting pattern with a high probability, as described above.

In step S19, if it is determined that the combination of logs matching with the direct serial starting pattern occurs with a probability that is equal to or higher than the threshold value, the order relationship extracting unit 121 sets the relationship between the batch jobs a and b as the next relationship. Since the probability of occurrence of a combination of logs is associated with the order, the shift from the batch job a to the batch job b and the shift from the batch job b to the batch job a are handled separately. In the example above, the next relationship is set for the shift from the batch job J1.sh to the batch job J2.sh. The next relationship is also set for the shift from the batch job J2.sh to the batch job J3.sh. The thus set relationships are stored as order relationship data in the order relationship data storage unit 131. The processing then moves to step S27.

FIG. 8 illustrates an example of data stored in the order relationship data storage unit 131. In the example of FIG. 8, the order relationship data storage unit 131 stores a link ID, a node number of a preceding job that is a preceding batch job and a node number of a subsequent job that is a subsequent batch job, and the type of relationship. In step S19, a link ID, such as links L1 and L2, is assigned to the detected next relationship. In the same manner, in step S19, the order relationship data storage unit 131 stores the node number assigned to a preceding batch job and a node number assigned to a subsequent batch job. In step S19, the data on the third row of FIG. 8 are not stored.

On the other hand, the combination of logs matching with the direct serial starting pattern may occur with a probability that is lower than the threshold value or may not occur at all. In this case, the order relationship extracting unit 121 determines whether combinations of logs match with a queuing pattern in which the finish time of the batch job a follows the start time of the batch job b, and the finish time of the batch job a precedes the finish time of the batch job b or not. In the same manner, the order relationship extracting unit 121 determines whether combinations of logs match a queuing pattern in which the finish time of the batch job b follows the start time of the batch job a and the finish time of the batch job b precedes the finish time of the batch job a or not. The subsequent batch jobs may be desirable to start at predetermined times. In step S21, the order relationship extracting unit 121 separately counts the numbers of times of matching for the order from the batch job a to the batch job b and the order from the batch job b to the batch job a. For example, in the example in FIG. 2, in the shift from the batch job J2.sh to the batch job J4.sh, the number of times of matching with the queuing pattern is "five" against the combination number 5 of the logs.

After that, in step S23, the order relationship extracting unit 121 determines whether the log matching with the queuing pattern occurs with a probability that is equal to or higher than a threshold value or not. For example, when 80% is the threshold value, the order relationship extracting unit 121 determines that the shift from the batch job J2.sh to the batch job J4.sh corresponds to the queuing pattern with a high probability.

In step S25, if it is determined that a combination of logs matching with the queuing pattern occurs with a probability that is equal to or higher than a threshold value, the order relationship extracting unit 121 sets the relationship between the batch jobs a and b as the activate relationship. Since the probability of occurrence of a combination of logs is also associated with the order, the shift from the batch job a to the batch job b and the shift from the batch job b to the batch job a are handled separately. In the example above, the activate relationship is set for the shift from the batch job J2.sh to the batch job J4.sh. The thus set relationships are stored as order relationship data in the order relationship data storage unit 131. As illustrated on the third row of FIG. 8, the order relationship data storage unit 131 assigns a link ID to the newly detected order relationship, and stores the node number assigned to the preceding batch job and the node number assigned to the subsequent batch job in association.

On the other hand, if a combination of logs matching with the queuing pattern occurs with a probability that is lower than the threshold value or does not occur at all or after step S19 or S25, the order relationship extracting unit 121 determines whether all pairs of batch jobs in the job list have been processed or not in step S27. If any unprocessed pair exists, the processing returns to step S11. On the other hand, if all pairs have been processed, the processing returns to the beginning.

Performing the processing can provide the order relationship between batch jobs as illustrated in FIG. 8, for example. This may be illustrated as a digraph in FIG. 9. According to this embodiment, two types of link are provided. However, if some batch jobs can be associated by other patterns, the number of types of link may be increased. In some cases, links may be set so as to create a loop in the digraph. However, the existence of a loop in the digraph is not preferable for estimation of the finish time. Thus, if a loop occurs, for example, the link occurring with the lowest probability may be disconnected in addition.

As may be described below, the identification of the activate relationship allows more accurate grasp of a correlation of processing times.

Referring back to the description on the processing in FIG. 3, in step S7, the job processing time estimating unit 122 next uses the data stored in the log data storage unit 111 and order relationship data storage unit 131 to perform processing-time-correlation estimation processing. The processing-time-correlation estimation processing may be described with reference to FIG. 10 to FIG. 15.

In step S31, the job processing time estimating unit 122 selects reachable unprocessed batch jobs a and b on the basis of the order relationship data stored in the order relationship data storage unit 131. In the example in FIG. 9, the batch job J3.sh and the batch job J4.sh are not a reachable combination of batch jobs since they are linked in the reverse direction. Therefore, such combinations are not selected. In the digraph, unreachable combinations of batch jobs are determined as not having a correlation between the batch jobs.

Next, in step S33, the job processing time estimating unit 122 uses log data stored in the log data storage unit 111 to calculate the processing times of the batch jobs a and b and stores the results in the job processing-time data storage unit 132. At that time, the job processing time estimating unit 122 checks, from the order relationship data stored in the order relationship data storage unit 131, whether either batch job a or batch job b is set with the activate relationship and is designated as the subsequent node or not. For example, if the batch job b is a batch job J4.sh, it is set with the activate relationship and is the subsequent node, in the example in FIG. 8. According to this embodiment, in that case, the job processing time estimating unit 122 reads the last log regarding the preceding node connected to the link of the activate relationship from the log data storage unit 111. Next, the job processing time estimating unit 122 identifies the finish time of the last log as the start time. Next, the job processing time estimating unit 122 identifies the time from the start time to the finish time of the corresponding log regarding the subsequent node as the processing time.

Figure 11:
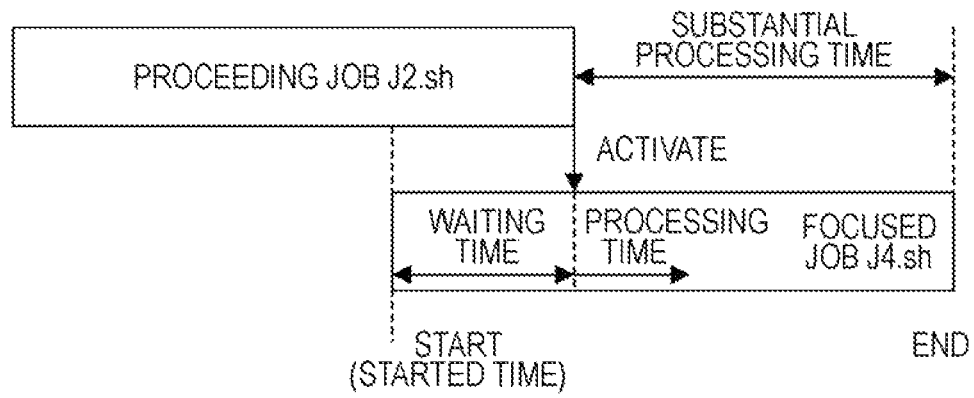
FIG. 11 is a diagram for describing a processing time calculation method.

As illustrated in FIG. 11, the subsequent focused batch job J4.sh waits for the preceding batch job J2.sh. Thus, the part where the processing time of the preceding batch job J2.sh and the processing time of the focused batch job J4.sh overlap with each other is a waiting time, and processing is not performed substantially. The substantial processing time is the processing time after the preceding batch job J2.sh finishes. Thus, as described above, the processing time is calculated, and the substantial processing time is calculated.

For the batch job of the node connected to the link of the next relationship, the time from the corresponding log start time to the finish time is identified as its processing time.

In the current step, for the processing time of each of batch jobs, the average value of the batch jobs is calculated and is stored in the job processing-time data storage unit 132. Instead of the average value, a statistical value may be used such as a minimum value, a maximum value, a mode value, and a 90 percentile value.

In step S35, the job processing time estimating unit 122 calculates a correlation coefficient between the processing time of the batch job a and the processing time of the batch job b. The correlation coefficient may be calculated by:

$$\frac{\sum_{i=1}^{n}(x_i-\bar{x})(y_i-\bar{y})}{\sqrt{\sum_{i=1}^{n}(x_i-\bar{x})^2}\sqrt{\sum_{i=1}^{n}(y_i-\bar{y})^2}}$$ [Formula 1]

where x is the processing time of the batch job a, y is the processing time of the batch job b, x-bar is an average value of x, and y-bar is an average value of y, and n is the number of batch job a or b.

The processing time of each batch job may be proportional to the amount of service data (such as the number of sales slips for one day). Thus, the processing times of different batch jobs depending on service data may possibly be correlated. For that reason, the presence of correlation is determined with the correlation coefficient, as described above.

In step S37, the job processing time estimating unit 122 determines whether the calculated correlation coefficient is equal to or higher than a predetermined threshold value or not. If the correlation coefficient is lower than the predetermined threshold value, the processing times of the batch jobs are not significantly correlated. Thus, the processing moves to step S41.

On the other hand, in step S39, if the calculated correlation coefficient is equal to or higher than the predetermined threshold value, the job processing time estimating unit 122 performs the well-known straight line regression calculation on the processing time of the batch job a and the processing time of the batch job b to calculate a proportionality coefficient. Next in step S39, the job processing time estimating unit 122 stores the correlation data including the proportionality coefficient in the job processing-time data storage unit 132. After step S39, the processing moves to step S41.

Figure 12:
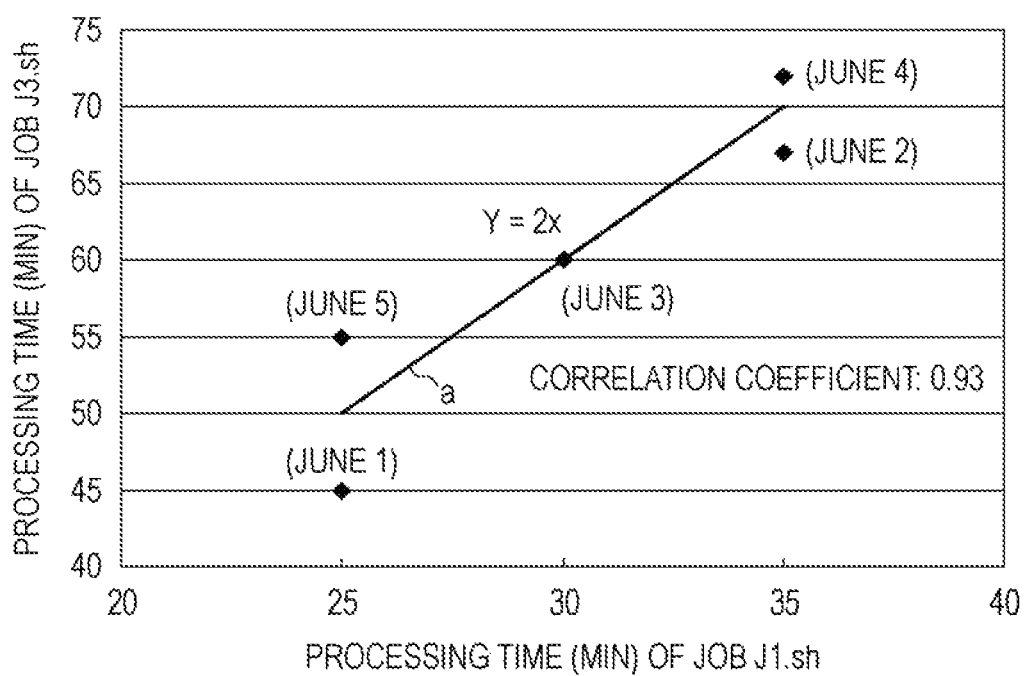
FIG. 12 schematically illustrates a correlation between processing times.

For example, a graph as illustrated in FIG. 12 can be obtained where the processing time of the batch job J1.sh is indicated by the horizontal axis, and the processing time of the batch job J3.sh is indicated by the vertical axis. Points are plotted with the processing time of the batch job J1.sh and the processing time of the batch job J3.sh for each day. Performing the well-known straight line regression calculation results in a straight line a as illustrated in FIG. 12. The gradient of a is calculated as "2.0". In other words, there is a relationship in which when the processing time of the batch job J1.sh is X, the processing time Y of the batch job J3.sh is equal to 2.0×. As illustrated in FIG. 12, it is assumed that the correlation coefficient of the processing time of the batch job J1.sh and the processing time of the batch job J3.sh is 0.93 which is higher than a threshold value of 0.9. Other approximation may be used instead of straight-line approximation if a correlation is found between other amounts than data amounts.

Figures 13, 14, 15:
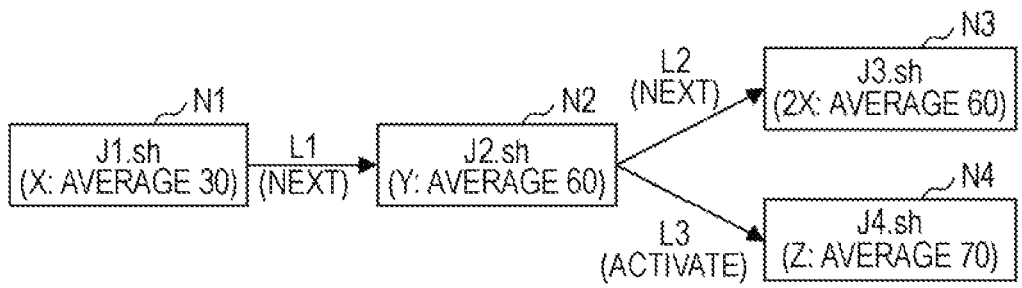
FIG. 13 illustrates an example of data stored in job processing-time data storage unit.
FIG. 14 illustrates data regarding correlations.
FIG. 15 illustrates an example of a job net model.

Thus, in step S39, as illustrated in FIG. 13, the correlation data is stored in the job processing-time data storage unit 132. In the example in FIG. 13, job processing-time data is registered under a job name. The job processing-time data includes an average value of processing times and a correlated variable that is correlation data. In the correlation data, in the example illustrated in FIG. 13, a correlated variable X is set for the processing time of the batch job J1.sh that is a reference, and a correlated variable 2X is set for the processing time of the related batch job J3.sh. Thus, data describing a relationship as illustrated in FIG. 12 can be held.

Referring back to FIG. 10, in step S41, whether all pairs of batch jobs that are reachable have been processed or not on the basis of the order relationship data. If any unprocessed pair of batch jobs exists, the processing returns to step S31.

On the other hand, if all pairs of jobs have been processed, the processing returns to the beginning.

Performing these steps can result in not only grasp of the order relationship as a digraph but also calculation of a correlation between processing times of batch jobs. Thus, more accurate modeling can be implemented.

For example, it is assumed that the job processing-time data as illustrated in FIG. 14 can be acquired finally. In the example in FIG. 14, a node ID is also given for easy understanding, but the data has the substantially same data structure as that in FIG. 13. The batch job J2.sh and batch job J4.sh are batch jobs that do not correlate with the processing times of the other batch jobs. In FIG. 14, correlated variables are "Y" and "Z" for convenience, but there are NULL in the processing described above.

Visualizing the job net model generated by the job net model generating unit 120, one as illustrated in FIG. 15 can be obtained, for example. FIG. 15 further includes the corresponding job processing-time data in addition to the nodes of the digraph illustrated in FIG. 9. It clarifies the relationship between batch jobs.

Figure 16:
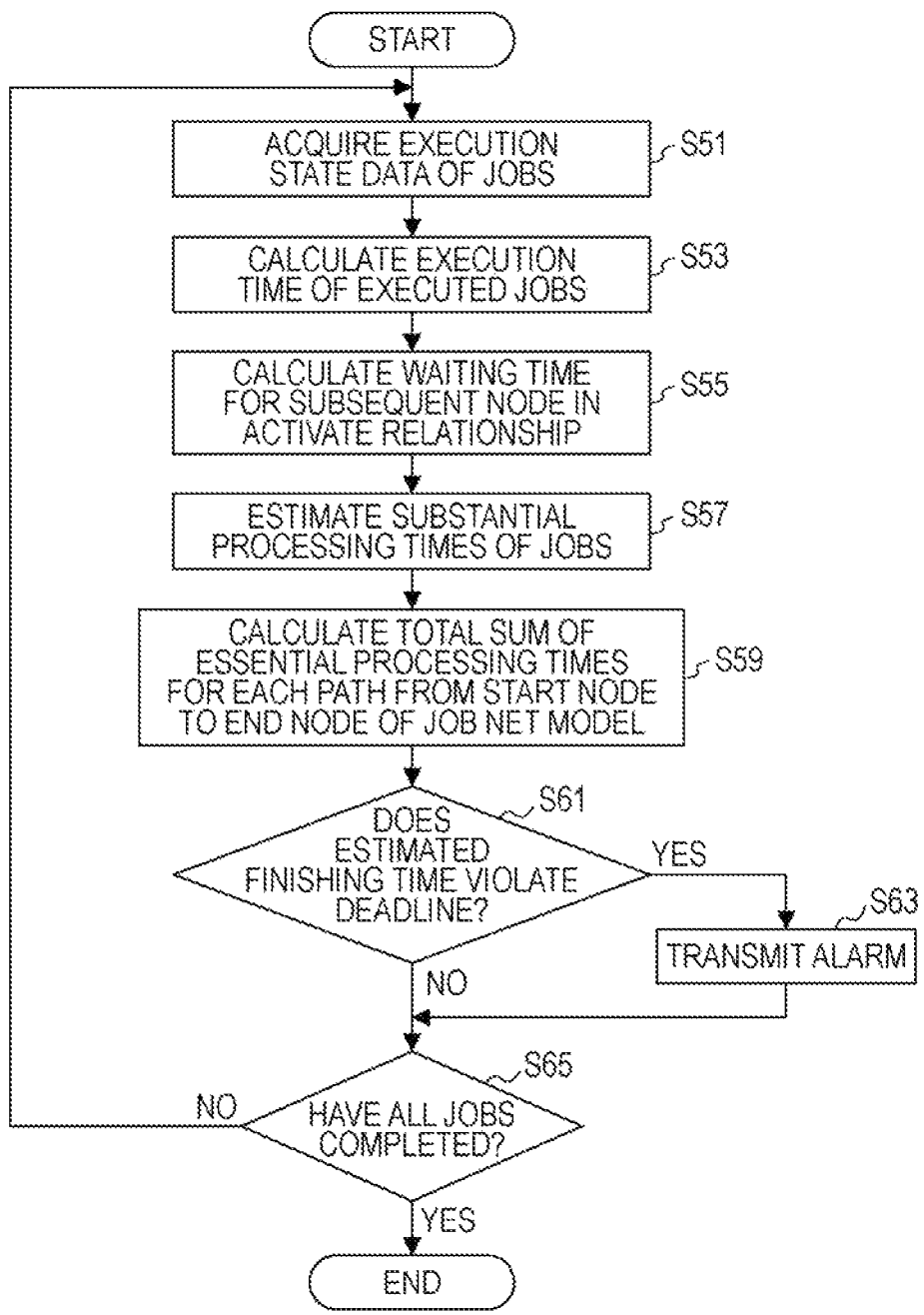
FIG. 16 illustrates a processing flow of processing to be performed when batch jobs are executed.

After the pre-processing described above is performed, processing for executing a batch job, which may be described with reference to FIG. 16 and FIG. 17, is performed.

First of all, in step S51, the job execution state monitoring unit 135 acquires execution condition data on jobs from the execution state measuring unit 210 in the monitoring target system 200. For example, the job execution state monitoring unit 135 acquires data including the execution start time of a batch job started to execute and/or the execution finish time of a batch job the execution of which has completed. Step S51 may be performed at predetermined periods such as ten minutes by the job execution state monitoring unit 135. However, step S51 may not be desirable to perform periodically. The job execution state monitoring unit 135 outputs the acquired execution condition data to the finish time estimating unit 136.

In step S53, the finish time estimating unit 136 uses the execution condition data to calculate the execution time of an executed job and stores it in the monitoring data storage unit 137. In step S53, the finish time estimating unit 136 calculates the difference between the start time of a batch job being executed and the current time acquired from a system clock. The finish time estimating unit 136 further calculates the difference between the start time and the finish time of a batch job the execution of which has completed. As described above, the processing time of a subsequent batch job associated under the activate relationship is from the finish time of the preceding batch job to the current time or the finish time of the subsequent batch job. Therefore, this step does not still identify the processing time.

In step S55, the finish time estimating unit 136 calculates a waiting time of a subsequent batch job (also called a subsequent node) under the activate relationship and stores the result in the monitoring data storage unit 137. In the example in FIG. 14, the batch job J4.sh is a subsequent node under the activate relationship. The waiting time of the batch job J4.sh is the period from the start time to the current time if the finish time of the preceding batch job (also called a preceding node) under the activate relationship is not recorded. If the finish time of the preceding node is recorded, the waiting time is the period from the start time to the finish time of the preceding node.

For example, a job execution condition as illustrated in FIG. 17 is assumed. As illustrated in FIG. 17, the batch job J1.sh is started to execute at 0:00. Next, the batch job J2.sh is started to execute at 0:40. Next, the batch job J3.sh is started to execute at 1:50. Next, the batch job J4.sh is started to execute at 1:00. On the other hand, since the batch job J2.sh that is the preceding batch job of the batch job J4.sh finishes at 1:50, all of the execution time of the batch job J4.sh up to 1:50 is its waiting time. This is on the column of the waiting time in FIG. 17. It is assumed here that the waiting time of a batch job excluding a subsequent batch job under the activate relationship is "0".

Next, in step S57, the finish time estimating unit 136 performs computing of estimating the substantial processing time (also called an individual processing time) of each batch job and stores the result in the monitoring data storage unit 137. The substantial processing time is calculated by max{(execution time−waiting time), average value}. The average value of those not correlated with other batch jobs is simply the average value stored in the job processing-time data storage unit 132. On the other hand, the "average value" of those correlated with other batch jobs is the value resulting from the multiplication of the substantial processing time calculated for another batch job by a proportionality coefficient.

For example, as illustrated in FIG. 14, when it is defined that the double of the processing time of the batch job J1.sh is the processing time of the batch job J3.sh, the substantial processing time of the batch job J1.sh is 30 minutes from 0:00 to 0:30. Thus, the average value of the batch job J3.sh is 60 minutes. During the period, since the execution time of the batch job J3.sh is 0 minute, the average value is the substantial processing time as it is. On the other hand, after 0:40, since the substantial processing time of the batch job J1.sh is 40 minutes, the average value of the batch job J3.sh is 80 minutes. In the example in FIG. 17, since processing time of the batch job J3.sh does not exceed 80 minutes, the substantial processing time of the batch job J3.sh is 80 minutes that is equal to the average value.

For the batch job J4.sh, the (execution time−waiting time) is calculated. Since the execution time and the waiting time are the same and are equal to "0" from 0:00 to 1:50, the average value is always higher. Thus, the substantial processing time is equal to the average value. On the other hand, at 2:00, the (execution time−waiting time) is equal to 10. Comparing it and the average value=70, the average value is higher. Therefore, at 2:00, the average value is the substantial processing time. However, the (execution time—waiting time) is longer than 70 minutes after a lapse of time from then, the (execution time−waiting time) is the substantial processing time.

Referring back to the processing in FIG. 16, in step S59, the finish time estimating unit 136 calculates the total sums of substantial processing times for paths from the start nodes to the end nodes in the job net model. Next, in step S59, the finish time estimating unit 136 identifies the maximum value of the total sums of the calculated substantial processing times and estimates the finish time with the value. As illustrated in FIG. 15, since the digraph branches, there are two end nodes. Therefore, a first path is J1.sh-J2.sh-J3.sh. A second path is J1.sh-J2.sh-J4.sh. For the first path, the total sum of the substantial processing times is calculated. For the second path, the total sum of the substantial processing times is calculated.

In the example in FIG. 17, until 0:30, the substantial processing time of the batch job J3.sh is shorter than the substantial processing time of the J4.sh, the total sum of the substantial processing times of the second path is used. On the other hand, after 0:40, they are reversed, and the total sum of the substantial processing times of the first path is used.

The finish time is the time after a lapse of the total sum of the substantial processing time from the start time of a start node in a job net model. In the example in FIG. 17, until 0:30, 2:40 is the estimated value of the finish time. From 0:40 to 1:40, 3:00 is the estimated value of the finish time. After that, 3:10 is the estimated value of the finish time.

The finish time estimating unit 136 notifies the estimated finish time to the deadline violation estimating unit 138.

In step S61, if the deadline violation estimating unit 138 receives the estimated finish time from the finish time estimating unit 136, the deadline violation estimating unit 138 reads the time of the deadline from the deadline definition data storage unit 133 and determines whether the estimated finish time violates the time of the deadline or not. For example, when 3:00 is stored in the deadline definition data storage unit 133, it is determined until 0:30 that the deadline is not violated. After that, it is determined that the deadline is being violated. In other words, at 0:40, the violation of the deadline is already estimated.

In step S63, if it is determined that the estimated finish time violates the deadline, the deadline violation estimating unit 138 reads a message sink mail address stored in the message sink data storage unit 134. In step S63, the deadline violation estimating unit 138 transmits an alarm mail to the message sink mail address. The alert may be issued by other methods excluding mailing.

Thus, an operator may operate the operator terminal 300 to receive the alarm mail and can recognize delay of the finish of the batch job. This allows stopping the execution of a batch job which can be postponed, or other measures can be taken.

If the estimated finish time does not violate the deadline, the deadline violation estimating unit 138 performs nothing.

In step S65, the job execution state monitoring unit 135 receives notification of the finish times of all batch jobs registered with a list stored in the order relationship data storage unit 131 and determines whether all batch jobs have finished or not. If all batch jobs have not finished, the job execution state monitoring unit 135 returns to step S51. On the other hand, if all batch jobs have finished, the processing ends.

Performing these operations can eliminate the necessity for complicated setting such as setting of deadlines for individual batch jobs and allows early and accurate estimation of violation of the deadlines.

Having described an embodiment, the embodiment art is not limited thereto. For example, the functional block diagram illustrated in FIG. 1 is only an example and does not typically agree with an actual program module configuration. The data holding configuration may be different from an actual data holding configuration.

Regarding the processing flows, the processing order may be changed or the operations may be performed in parallel if the processing result does not change.

The operator terminal 300 may receive notification of the finish time from the finish time estimating unit 136 whether the deadline is violated or not. A diagram like FIG. 15 may be displayed. In some cases, an operator may perform processing such as changing data stored in the order relationship data storage unit 131 and job processing-time data storage unit 132.

Figure 18:
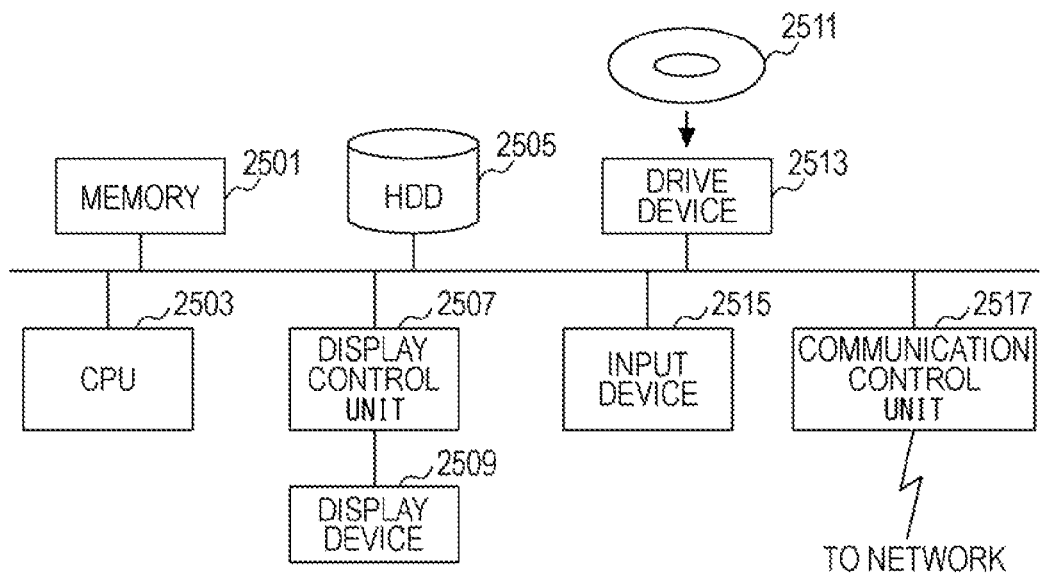
FIG. 18 is a functional block diagram of a computer.

The aforementioned batch job processing-time estimation apparatus 100 is a computer apparatus, and, as illustrated in FIG. 18, includes a memory 2501, a CPU 2503, a hard disk drive (HDD) 2505, a display control unit 2507, a drive device 2513, an input device 2515, and a communication control unit 2517, which are connected via a bus 2519. The display control unit 2507 is connected to a display device 2509. The drive device 2513 is used for a removable disk 2511. The communication control unit 2517 is used for connecting to a network. An operating system (OS) and an application program for performing processing according to this embodiment are stored in an HDD 2505. In order to execute the application program by the CPU 2503, it is read from the HDD 2505 to the memory 2501. The CPU 2503 controls the display control unit 2507, communication control unit 2517, and drive device 2513 so as to perform necessary operations as need arises. The data during processing may be stored in the memory 2501 and may be stored in the HDD 2505 if necessary. According to an embodiment, an application program for performing the aforementioned processing may be stored and distributed in a computer-readable removable disk 2511. The application program may be installed from the drive device 2513 to the HDD 2505. The application program may be installed through a network such as the Internet and the communication control unit 2517 to the HDD 2505. The computer apparatus implements functions as described above as a result of organic collaboration of hardware such as the CPU 2503 and memory 2501, an OS, and a necessary application program.

The aforementioned embodiment may be summarized as follows:

The current batch job processing-time estimation method includes an order-relationship data generation step of reading log data from a log data storage unit which stores log data including the start times and finish times of a plurality of batch jobs, generating order relationship data describing an order relationship between batch jobs from the start times and finish times included in the log data, and storing it in an order relationship data storage unit, a job processing-time data generation step of reading log data from the log data storage unit, determining from the start times and finish times included in the log data whether batch jobs are correlated in the processing times, generating job processing-time data including data regarding the correlation for each batch job, and storing it in a job processing-time data storage unit, and an estimation step of receiving execution condition data of a plurality of batch jobs from a monitoring target system which executes a plurality of batch jobs, estimating the finish times of a plurality of batch jobs from the execution condition data, data stored in the order relationship data storage unit, and data stored in the job processing-time data storage unit.

In this way, since order relationship data and job processing-time data including data regarding correlations are generated, the finish times can be estimated with high accuracy.

The job processing-time data generation step may further include the steps of identifying combinations of a first batch job and a second batch job that can be shifted from the first batch job among a plurality of batch jobs in accordance with the order relationship data stored in the order relationship data storage unit, and performing regression calculation on a combination of batch jobs having a correlation coefficient of processing times that is equal to or higher than a predetermined value among the identified combinations, generating data regarding the correlation, and storing it in the job processing-time data storage unit.

Since a correlation coefficient is calculated for a combination of a first batch job and a second batch job that can be shifted from the first batch job, impossible combinations can be excluded, and the processing load can be reduced. Performing regression calculation on a combination having a correlation coefficient that is equal to or higher than a predetermined value allows performing regression calculation only on a combination with a high correlation. Thus, the processing load can be reduced also from that point of view. Furthermore, for example, since data regarding a correlation such as a proportionality coefficient of an approximate expression acquired by regression calculation can be generated, the finish time can be estimated with high accuracy.

The order relationship data generation step may further include the steps of determining from the finish time of a preceding first batch job and the start time of the subsequent second batch job among a plurality of batch jobs whether a condition regarding a first order relationship in which the second batch job is executed in accordance with the completion of the first batch job is satisfied or not, and, if it is satisfied, storing data for associating under the first order relationship between the first batch job and the second batch job in the order relationship data storage unit, and determining from the start time and finish time of a preceding third batch job and the start time and finish time of a subsequent fourth batch job among a plurality of batch jobs whether a condition regarding a second order relationship in which the fourth batch job starts during the execution of the third batch job and the third batch job finishes during the execution of the fourth batch job is satisfied or not, and, if it is satisfied, storing data for associating under the second order relationship the third batch job and the fourth batch job in the order relationship data storage unit. The identification of two kinds of order relationship in accordance with characteristics of batch jobs allows estimation of the finish time with high accuracy. The fourth batch job may further be desirable to start at a predetermined time.

Furthermore, the order relationship data may include data including an identifier of a first order relationship in which a subsequent second batch job is executed in accordance with the completion of a preceding first batch job among a plurality of batch jobs and identification information of the first and second batch jobs and data including an identifier of a second order relationship in which a subsequent fourth batch job starts during the execution of a preceding third batch job and the third batch job finishes during the execution of the fourth batch job among a plurality of batch jobs and identification information of the third and fourth batch jobs. In this case, the step of estimating may include the step of calculating the execution times of batch jobs from execution condition data, the step of, for the fourth batch job, calculating the waiting time from the start of the fourth batch job to the finish time of the third batch job from execution condition data and calculating the difference between the execution time and the waiting time as an execution time, an estimated-processing-time calculation step of identifying an individual processing time that is a longer time of the execution time for each of batch jobs included in the path and the estimated processing time identified from the processing time data stored in the processing time data storage unit for each path from the first batch job to the last batch job, the path being identified from the order relationship data stored in the order relationship data storage unit, accumulating the identified individual processing times and calculating the estimated processing time, and the step of identifying the longest estimated processing time among the estimated processing times calculated for the paths.

Thus, the finish time can be estimated with high accuracy by assuming the worst case.

The job processing-time data may include data regarding a correlation between the processing time of a preceding fifth batch job and the processing time of a subsequent sixth batch job. In this case, the step of identifying an estimated processing time may include the step of calculating an estimated processing time of the sixth batch job from the individual processing time of the fifth batch job on the path and data regarding the correlation between the fifth and sixth batch jobs. Thus, the finish time can be estimated by reflecting data regarding the execution conditions and correlation between batch jobs.

Figure 19:
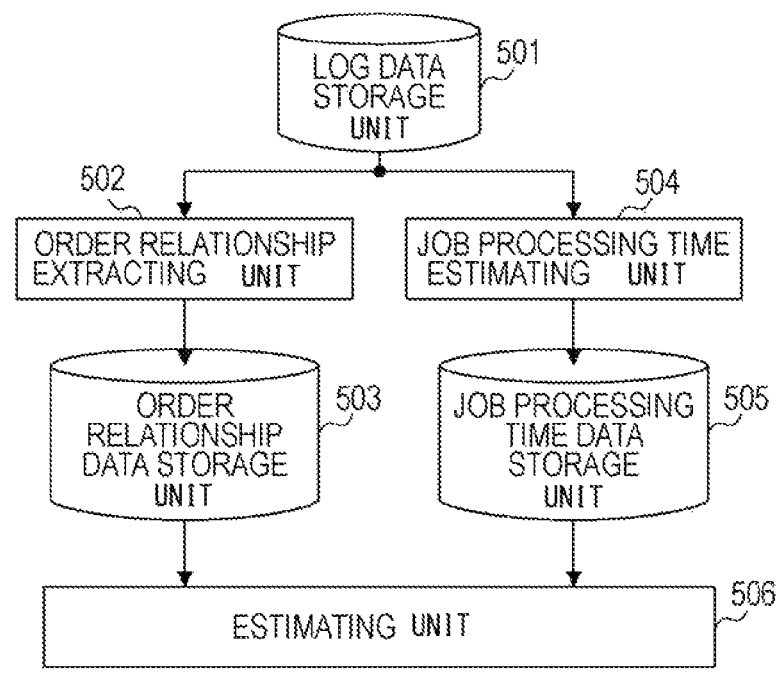
FIG. 19 is a functional block diagram of a batch job processing-time estimation apparatus.

The current batch job processing-time estimation apparatus (FIG. 19) includes an order relationship extracting unit (502) reading log data from a log data storage unit (501) which stores log data including the start times and finish times of a plurality of batch jobs, generating order relationship data describing an order relationship between batch jobs from the start times and finish times included in the log data, and storing it in an order relationship data storage unit (503), a job processing-time estimating unit (504) of reading log data from the log data storage unit, determining from the start times and finish times included in the log data whether batch jobs are correlated in the processing times, generating job processing-time data including data regarding the correlation for each batch job, and storing it in a job processing-time data storage unit (505), and an estimating unit (506) of receiving execution condition data of a plurality of batch jobs from a monitoring target system which executes a plurality of batch jobs, estimating the finish times of a plurality of batch jobs from the execution condition data, data stored in the order relationship data storage unit, and data stored in the job processing-time data storage unit.

A computer readable storage medium storing a program causing a computer to execute a processing time estimation operation above may be generated, and the program may be stored in a computer-readable storage medium or storage device such as a flexible disk, a CD-ROM, a magnet-optical disk, a semiconductor memory (such as a ROM), and a hard disk. The data being processed may be temporarily held in a storage device such as a RAM.

Regarding embodiments including the aforementioned embodiment, the following appendices may be disclosed.

All examples and conditional language recited herein are intended for pedagogical purposes to aid the reader in understanding the embodiment and the concepts contributed by the inventor to furthering the art, and are to be construed as being without limitation to such specifically recited examples and conditions, nor does the organization of such examples in the specification relate to a illustrating of the superiority and inferiority of the embodiment. Although the embodiment of the present invention has been described in detail, it should be understood that the various changes, substitutions, and alterations could be made hereto without departing from the spirit and scope of the invention.

What is claimed is:

1. A processing time estimation method for estimating a processing time of each of a plurality of jobs, the processing time estimation method comprising:

determining, executed by a computer, whether the each job has a preceding job thereof on the basis of previous execution data including previous information of a plurality of previous start times and previous finish times of respective jobs of the plurality of jobs, the preceding job of the each job being included in the plurality of jobs and at least having the previous finish time earlier than the previous finish time of the each job;

calculating, executed by the computer, a previous processing time of the each job, the previous processing time of the each job being calculated on the basis of the previous start time and the previous finish time of the each job whether the each job does not have the preceding job thereof, the previous processing time of the each job being calculated on the basis of the previous start time and the previous finish time of the each job and the previous finish time of the preceding job of the each job whether the each job has the preceding job thereof;

calculating, executed by the computer, a processing time of the each job on the basis of the previous processing times of the each job; and calculating, executed by the computer, an estimated processing time of the each job on the basis of current execution data including current information of a current start time and a current finish time of the respective jobs of the plurality of jobs, the estimated processing time of the each job being calculated on the basis of the estimated processing time of the depended job of the each job if the each job does not finish and has the depended job thereof.

2. The processing time estimation method according to claim 1, wherein a difference between the finish time of the preceding job of the each job and the start time of the each job is less than a predetermined time.

3. The processing time estimation method according to claim 1, wherein the finish time of the preceding job of the each job is later than the start time of the each job.

4. The processing time estimation method according to claim 1, further comprising:

calculating, executed by the computer, an estimated finish time of the each job, the estimated finish time of the each job being calculated on the basis of the estimated processing time of the each job whether the each job does not finish and does not have the preceding job thereof, the estimated finish time of the each job being calculated on the basis of the finish time of the preceding job of the each job and the estimated processing time of the each job whether the each job does not finish and has the preceding job thereof; and determining, executed by the computer, a latest finish time which is latest among the estimated finish times of the plurality of jobs.

5. A processing time estimation apparatus for estimating a processing time of each of a plurality of jobs, the processing time estimation apparatus comprising:

a memory for storing previous execution data including previous information of a plurality of previous start times and previous finish times of respective jobs of the plurality of jobs; and a processor for determining whether the each job has a preceding job thereof on the basis of the previous execution data, the preceding job of the each job being included in the plurality of jobs and at least having the previous finish time earlier than the previous finish time of the each job, calculating a previous processing time of the each job, the previous processing time of the each job being calculated on the basis of the previous start time and the previous finish time of the each job whether the each job does not have the preceding job thereof, the previous processing time of the each job being calculated on the basis of the previous start time and the previous finish time of the each job and the previous finish time of the preceding job of the each job whether the each job has the preceding job thereof, calculating a processing time of the each job on the basis of the previous processing times of the each job, and calculating an estimated processing time of the each job on the basis of current execution data including current information of a current start time and a current finish time of the respective jobs of the plurality of jobs, the estimated processing time of the each job being calculated on the basis of the estimated processing time of the depended job of the each job whether the each job does not finish and has the depended job thereof.

6. A processing time estimation method for estimating a processing time of each of a plurality of jobs, the processing time estimation method comprising:

determining, executed by a computer, whether the each job has a preceding job thereof on the basis of previous execution data including previous information of a plurality of previous start times and previous finish times of respective jobs of the plurality of jobs, the preceding job of the each job being included in the plurality of jobs and at least having the previous finish time earlier than the previous finish time of the each job;

calculating, executed by the computer, a previous processing time of the each job, the previous processing time of the each job being calculated on the basis of the previous start time and the previous finish time of the each job;

calculating, executed by the computer, a processing time of the each job on the basis of the previous processing times of the each job;

determining, executed by the computer, if the each job has a depended job thereof, the depended job of the each job being a reachable job of the each job, the depended job of the each job having the processing time having a correlation coefficient greater than a predetermined value with the processing time of the each job, the reachable job of the each job being the preceding job of the each job or the reachable job of the preceding job of the each job; and calculating, executed by the computer, the estimated processing time of the each job being calculated on the basis of the estimated processing time of the depended job of the each job if the each job does not finish and has the depended job thereof.

7. The processing time estimation method according to claim 6, further comprising:

calculating, executed by a computer, a proportionality coefficient of the processing time of the each job to the processing time of the depended job thereof whether the each job has the depended job of the each job, the processing time being calculated on the basis of an average processing time of the each job, which is an average of the previous processing times of the each job, and the estimated processing time of the each job is calculated on the basis of a product of the proportionality coefficient and the estimated processing time of the depended job of the each job whether the each job does not finish and has the depended job thereof.

8. The processing time estimation method according to claim 6, further comprising:

calculating, executed by the computer, an estimated finish time of the each job, the estimated finish time of the each job being calculated on the basis of the estimated processing time of the each job whether the each job does not finish and does not have the preceding job thereof, the estimated finish time of the each job being calculated on the basis of the finish time of the preceding job of the each job and the estimated processing time of the each job whether the each job does not finish and has the preceding job thereof; and determining, executed by the computer, a latest finish time which is latest among the estimated finish times of the plurality of jobs.

9. A processing time estimation apparatus for estimating a processing time of each of a plurality of jobs, the processing time estimation apparatus comprising:
- a memory configured to store previous execution data including previous information of a plurality of previous start times and previous finish times of respective jobs of the plurality of jobs; and
- a processor coupled to the memory and configured to:
  - determine whether the each job has a preceding job thereof on the basis of previous execution data including previous information of a plurality of previous start times and previous finish times of respective jobs of the plurality of jobs, the preceding job of the each job being included in the plurality of jobs and at least having the previous finish time earlier than the previous finish time of the each job,
  - calculate a previous processing time of the each job, the previous processing time of the each job being calculated on the basis of the previous start time and the previous finish time of the each job,
  - calculate a processing time of the each job on the basis of the previous processing times of the each job,
  - determine whether the each job has a depended job thereof, the depended job of the each job being a reachable job of the each job, the depended job of the each job having the processing time having a correlation coefficient greater than a predetermined value with the processing time of the each job, the reachable job of the each job being the preceding job of the each job or the reachable job of the preceding job of the each job, and
  - calculate the estimated processing time of the each job being calculated on the basis of the estimated processing time of the depended job of the each job whether the each job does not finish and has the depended job thereof.

* * * * *